(12) United States Patent
Ezri et al.

(10) Patent No.: US 10,523,485 B2
(45) Date of Patent: Dec. 31, 2019

(54) GENERALIZED FREQUENCY DIVISION MULTIPLEXED TRANSMISSION FOR NARROWBAND WITH INTERNET OF THINGS (IOT) DEVICES

(71) Applicant: Huawei Technologies Co., Ltd., Shenzhen (CN)

(72) Inventors: Doron Ezri, Hod Hasharon (IL); Shimon Shilo, Hod Hasharon (IL); Hao Tang, Shanghai (CN); Jiehua Xiao, Shanghai (CN); Jianmin Lu, Shanghai (CN); Ori Shental, Munich (DE); Ezer Melzer, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/034,721

(22) Filed: Jul. 13, 2018

(65) Prior Publication Data

US 2018/0337811 A1    Nov. 22, 2018

Related U.S. Application Data

(63) Continuation of application No. PCT/CN2017/071168, filed on Jan. 13, 2017.

(30) Foreign Application Priority Data

Jan. 14, 2016    (EP) .................................... 16151340

(51) Int. Cl.
*H04L 27/26*    (2006.01)
*H04B 7/0452*    (2017.01)
*H04L 5/00*    (2006.01)

(52) U.S. Cl.
CPC ....... *H04L 27/2614* (2013.01); *H04B 7/0452* (2013.01); *H04L 5/005* (2013.01);
(Continued)

(58) Field of Classification Search
CPC ............ H04L 27/2614; H04L 27/2626; H04L 27/2627; H04L 27/264; H04L 5/005; H04B 7/0452
See application file for complete search history.

(56) References Cited

U.S. PATENT DOCUMENTS 7,161,896 B1 *   1/2007   Hart .................... H04L 25/0228
                                                         370/206
2009/0207896 A1    8/2009   Behzad
(Continued)

FOREIGN PATENT DOCUMENTS

CN    1367615 A    9/2002
CN    101112005 A   1/2008
(Continued)

OTHER PUBLICATIONS

Thomas, P.A. et al.,"SC-FDMA—An Efficient Technique for PAPR Reduction in Uplink Communication Systems—A Survey," IJRET: International Journal of Research in Engineering and Technology, eISSN: 2319-1163 | pISSN: 2321-7308, pp. 53-59.
(Continued)

*Primary Examiner* — Siu M Lee
(74) *Attorney, Agent, or Firm* — Slater Matsil, LLP

(57) ABSTRACT

An apparatus for band-limited frequency division multiplexing for uplink transmission to a base station or access point, particularly from an IoT device, comprises a signal modulator to transmit a signal over a set of contiguous equally spaced frequency sub-carriers ranging from a lowest frequency sub-carrier via intermediate sub-carriers to a highest frequency sub-carrier. The signal modulator contains a filter to apply asymmetric filtering over the range of the frequency sub-carriers, thereby to reduce a peak-to-average power ratio of the transmitted signal.

18 Claims, 15 Drawing Sheets

(52) U.S. Cl.
CPC ........ *H04L 27/264* (2013.01); *H04L 27/2626* (2013.01); *H04L 27/2627* (2013.01)

(56) References Cited

U.S. PATENT DOCUMENTS

| | | |
|---|---|---|
| 2009/0325589 A1 | 12/2009 | Michel et al. |
| 2011/0235685 A1 | 9/2011 | Sutivong et al. |
| 2012/0076250 A1 | 3/2012 | Kravtsov |
| 2012/0093124 A1 | 4/2012 | Zhang et al. |
| 2013/0195052 A1 | 8/2013 | Ahmadi |
| 2016/0164712 A1* | 6/2016 | Matthe ................ H04L 25/0384 375/298 |
| 2018/0070348 A1 | 3/2018 | Ouchi et al. |

FOREIGN PATENT DOCUMENTS

| | | |
|---|---|---|
| CN | 101502070 A | 8/2009 |
| CN | 101795152 A | 8/2010 |
| EP | 1881662 A1 | 1/2008 |
| EP | 2445154 A1 | 4/2012 |
| JP | 2009544208 A | 12/2009 |
| JP | 2012530419 A | 11/2012 |
| JP | 2013017016 A | 1/2013 |
| WO | 2007091235 A2 | 8/2007 |
| WO | 2011031434 A1 | 3/2011 |
| WO | 2014123926 A1 | 8/2014 |

OTHER PUBLICATIONS

QUALCOMM, "New Work Item: NarrowBand IOT (NB-IOT)," 3GPP TSG RAN Meeting #69, RP-151621, Phoenix, USA, Sep. 14-16, 2015, 9 pages.

Neul et al., "PAPR reduction for single-tone PUSCH transmissions", [online], 3GPP TSG RAN WG1 NB-IoT Ad-Hoc Meeting, R1-160100, Jan. 12, 2016, 13 pages.

* cited by examiner

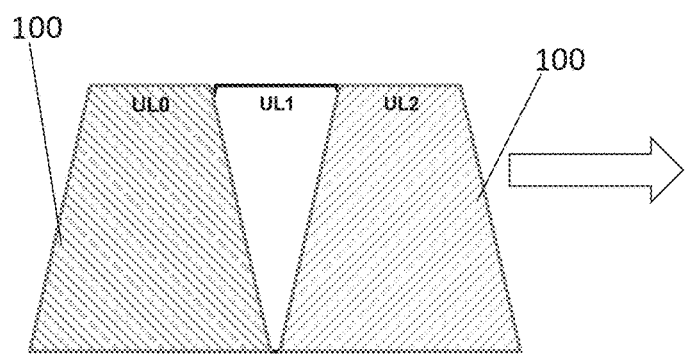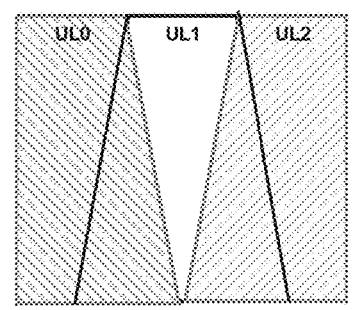
FIG. 12A
FIG. 12B

GENERALIZED FREQUENCY DIVISION MULTIPLEXED TRANSMISSION FOR NARROWBAND WITH INTERNET OF THINGS (IOT) DEVICES

CROSS-REFERENCE TO RELATED APPLICATIONS

This application is a continuation of International Application No. PCT/CN2017/071168, filed on Jan. 13, 2017, which claims priority to European Patent Application No. EP16151340.3, filed on Jan. 14, 2016. The disclosures of the aforementioned applications are hereby incorporated by reference in their entireties.

TECHNICAL FIELD

The present invention, in some embodiments thereof, relates to a generalized Frequency Division Multiple Access (FDMA) transmission scheme for narrowband and, more particularly, but not exclusively, to such transmission in relation to Internet of Things (IoT) devices.

BACKGROUND

The Internet of Things (IoT) is the network of physical objects or things embedded with electronics, software, sensors, and network connectivity, which enables these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. IoT devices include wearables such as smart watches, and sports sensors, as well as distributed sensors and actuators and enable technologies such as smart buildings or smart grids and the like.

A question arises as to how to communicate with IoT devices. In one possibility, narrowband FDM transmission may be used between IoT devices and a base station or eNodeB or Access Point or hot spot (collectively referred to as BS herein below), and in that case there may be a restriction on the number of frequency sub-bands or overall bandwidth that can be assigned to any individual device.

Peak-to-Average Power Ratio (PAPR) of the transmitted signals is a crucial factor in power-efficient communications and specifically for narrowband (NB) IoT as such. A large PAPR entails substantial limitations on the transmission power regime mainly due to non-linearity of the power amplifier (PA). A PA backoff is dictated according to the achieved PAPR, thus calling for a reduced average transmit power and evidently reducing the coverage range. The superior behavior of Single-Carrier FDM (SC-FDM) over OFDM in terms of PAPR was the main incentive for it being chosen as the modulation technique for the uplink of the E-UTRA standard (a.k.a. LTE).

However, the currently considered alternatives for NB-IoT transmission as part of the LTE specification has only narrow frequency allocation, and subsequently limited throughput, of only up to a few (e.g. 1, 2, 4 or 8) subcarriers (SCs) due to PAPR limitations. While transmission of SC-FDM over 1 or 2 SCs implies near 0 dB PAPR, the PAPR with, say, 32 SCs is around 8dB, which incurs a too high PA backoff and thus reduced coverage for these purposes.

SUMMARY

An object of the present invention is to improve power efficiency in mobile communications and in particular reduce a PAPR in uplink communication.

The present embodiments may address the above problem with the PAPR and increase coverage for any mode deploying more than just a few, say more than two, sub-carriers.

A further significant reduction in PAPR of SC-FDM is suggested for radio transmission in NB-IoT, which is superior to the one adopted in the LTE alternative of cellular telephony.

According to an aspect of some embodiments of the present invention there is provided an apparatus for band-limited frequency division multiplexing for uplink transmission to a base station or access point. The apparatus comprises a signal modulator adapted to transmit a signal over a set of contiguous equally spaced frequency sub-carriers ranging from a lowest frequency sub-carrier via intermediate sub-carriers to a highest frequency sub-carrier. The signal modulator further comprises a filter adapted to apply asymmetric filtering over the range of the frequency sub-carriers, thereby to reduce a peak-to-average power ratio of the transmitted signal.

In an embodiment, the signal modulator is configured to cyclically extend the sequence of complex-valued numbers modulating an initial set of contiguous sub-carriers to a required larger set of contiguous sub-carriers and apply the asymmetric filtering operation onto the larger set of contiguous sub-carriers.

In an embodiment, the asymmetric filtering is configured to maintain orthogonality between waveforms which are used to modulate the data symbols at the input of the signal modulator.

In an embodiment, the maintaining orthogonality comprises applying a constraint to coefficients of the asymmetric filtering, wherein for M tones, absolute values of filter coefficients for each tone are squared and then summed over cyclically extended tone replicas, and a resulting sum is constrained to remain the same for all the M tones.

In an embodiment, for a $\pi/2$ BPSK modulation scheme, the maintaining orthogonality comprises applying a constraint to coefficients of the asymmetric filtering, wherein for M tones and M being even:

$$\sum_{l=k \ (\mathrm{mod} \ M)} (|g_l|^2 + |g_{M/2-l}|^2) =$$

const (independent of tone index $k = 0, 1, \ldots, M-1$)

In an embodiment, the signal modulator is adapted for any one of the group of modulations consisting of frequency division multiplexing, frequency division multiple access (FDMA), single carrier FDMA (SC-FDMA) and orthogonal FDMA (OFDMA).

In an embodiment, the signal modulator is adapted to transmit a demodulation reference signal for each of the set of sub-carriers respectively, wherein each demodulation reference signal extends over adjacent overlapping regions of neighboring ones of the sets of sub-carriers, each demodulation reference signal being selected out of a finite set of demodulation reference signals which are mutually orthogonal, thereby to assist a receiver with demodulation of data received in the overlapping regions.

In an embodiment, the signal modulator is adapted to transmit a demodulation reference signal for each set of sub-carriers respectively, wherein each demodulation reference signal alternates at different time intervals between an upper overlap region and a lower overlap region respectively on either side of intermediate ones of the sub-carriers in the set.

In an embodiment, the signal modulator is further adapted to alternately enlarge and contract the range of the sub-carriers on which a respective demodulation reference signal is mapped to cover and uncover a respective adjacent overlap region.

Embodiments of the present invention may be placed in Internet of things Device (IoT) and/or used in communication with such devices.

In a second aspect of the present invention there is provided an Internet of things device (IoT) adapted to communicate with a base station using contiguous bands of a frequency division multiple access via band-limited modulation, the contiguous bands being assigned to each IoT device by the base station from a set of bands, the IoT device being adapted to apply an asymmetric filter on the signal to be transmitted by the the device over the frequency band assigned to the device.

The device may be a sensor or a wearable.

According to a third aspect of the present invention there may be provided base station apparatus for frequency division multiple access. The base station apparatus may include a transceiver adapted for communicating with a plurality of surrounding devices, wherein the transmitter of the transceiver is adapted for distributing a plurality of sets of contiguous sub-carriers in overlapped manner where each such set is accompanied by a filter out of a set of plurality of filters at least one of which is asymmetric in frequency, and signaling over a downlink channel each one of the plurality of devices an assignment of a single set of sub-carriers out of the plurality of sets together with an indication of an associated filtering method. The devices are adapted to apply the indicated filtering operation onto the signal transmitted in the uplink over the assigned set of contiguous sub-carriers, the base station further comprising an uplink receiver adapted to receive the filtered signals.

A transmitter of each of the devices may be configured to cyclically extend the sequence of complex-valued numbers modulating an initial set of contiguous sub-carriers to a required larger set of contiguous sub-carriers and to apply the asymmetric filtering operation, thereby to form a signal whose spectral support covers a the larger set of contiguous sub-carriers in frequency domain.

The transceiver may be adapted receive signals of any one of the group of modulations consisting of frequency division multiplexing, frequency division multiple access (FDMA), single carrier FDMA (SC-FDMA) and orthogonal FDMA (OFDMA).

The transceiver may be adapted to assign a demodulation reference signal for each of the set of sub-carriers respectively, wherein each demodulation reference signal extends over adjacent overlapping regions of neighboring ones of the sets of sub-carriers, each demodulation reference signal being selected out of a finite set of demodulation reference signals which are mutually orthogonal, thereby to assist the receiver in the transceiver with demodulation of data signals received in the overlapping regions.

In an embodiment, the transceiver is adapted to assign a demodulation reference signal for each of the set of sub-carriers respectively, wherein each demodulation reference signal alternates at different time intervals between an upper overlap region and a lower overlap region respectively on either side of intermediate ones of the sub-carriers in the set, the assigning comprising signaling a demodulation reference signal configuration.

According to a fourth aspect of the present invention there is provided a method of for band-limited frequency division multiplexing. The method includes transmitting a set of contiguous equally spaced frequency sub-carriers ranging from a lowest frequency sub-carrier via intermediate sub-carriers to a highest frequency sub-carrier. The method also includes applying asymmetric filtering over the range of the frequency sub-carriers.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve selected tasks being implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 12A and 12B respectively show overlapping as in FIG. 9 and asymmetric filtering of the upper end of the highest frequency sub-carrier and of the lower end of the lowest frequency sub-carrier;

DETAILED DESCRIPTION OF ILLUSTRATIVE EMBODIMENTS

Figure 1:
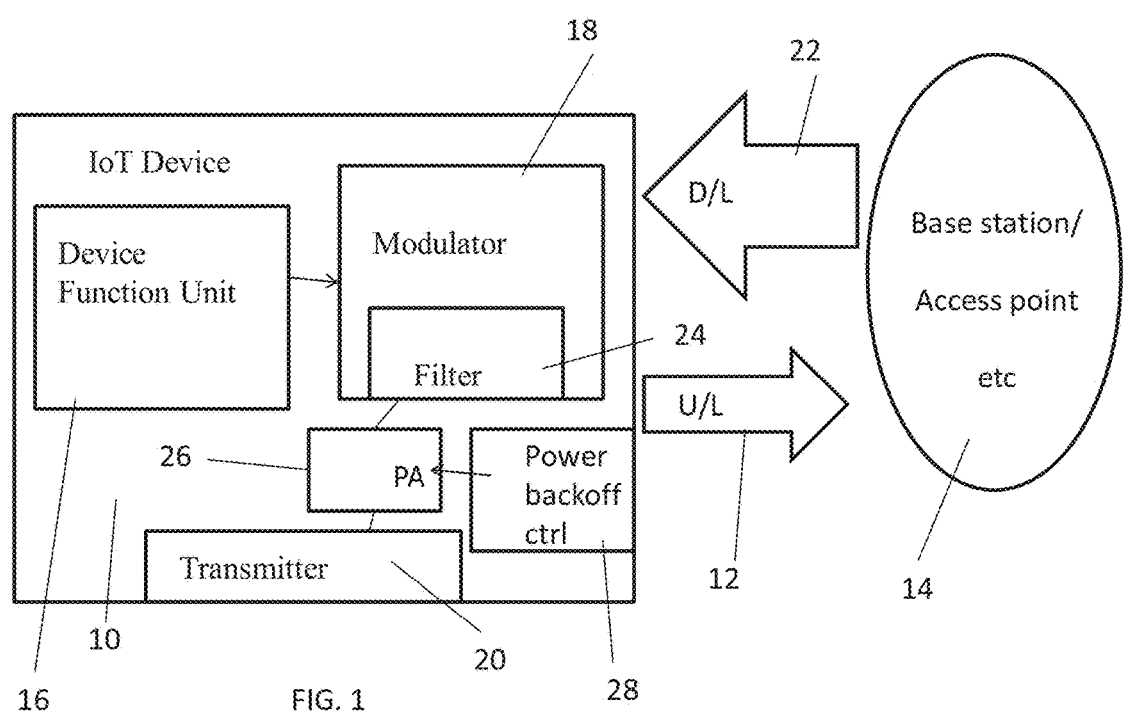
FIG. 1 is a simplified block diagram illustrating apparatus for use in an IoT device for uplink transmission according to a first embodiment of the present invention.

The present invention, in some embodiments thereof, relates to a generalized FDMA transmission and, more particularly, but not exclusively, to such transmission in relation to Internet of Things (IoT) devices.

In communication between a BS and devices an uplink (UL) is defined as the direction from the device to the BS, and the downlink (DL) is the direction from the BS to the device. The present embodiments relate principally to transmission in the UL direction, although control setup data is transmitted in the DL direction, and the present embodiments may define an uplink (UL) transmission scheme which has significantly lower PAPR than ordinary (LTE like) single carrier frequency division multiplexing (SC-FDM), where LTE is Long Term Evolution cellular telephony, otherwise known as fourth generation. The reduction may be achieved via a simple and minimal modification to the existing scheme used by LTE. Nevertheless, the proposed scheme does not render the spectral or bandwidth efficiency any worse with respect to ordinary Single-Carrier Frequency Division Multiple Access (SC-FDMA) systems. The present embodiments may also allow for multi user (MU) detection with a single fast Fourier transform (FFT) on the receiver end.

While PAPR reduction mechanisms have been proposed in the literature, mostly at the expense of consumed excess bandwidth (BW), the present embodiments may eliminate the need for an excess UL BW (for multiple users), and require only a relatively simple detection circuit and a relatively feasible signaling design, including demodulation reference signals (DMRS) and downlink control indicator (DCI) formatting.

The transmission scheme of the present embodiments may be applied to multi user multi-input multi-output (MIMO) with relative ease.

In the present embodiments an extension of generalized FDMA (G-FDMA) scheme is disclosed, hereinafter G2-FDMA, with a respective DMRS design, signaling and an extension to MU-MIMO. It is noted that the DMRS design, signaling and extension to MU-MIMO are also relevant and applicable in the context of G-FDMA.

Some benefits of one or more of the present embodiments may include one or more of the following. G2-FDMA may provide elimination of the excess bandwidth for PAPR reduction which is implied by G-FDMA, and allows an effective allocation strategy for a mixture of transmission schemes.

The DMRS designs discussed below may pave the way for an efficient implementation of G2-FDMA and G-FDMA in practical standards (focusing on NB-IoT).

Additional signaling as discussed below is general and can be made quite minimal (e.g. 4-6 bits).

A fusion of G2-FDMA and G-FDMA with MU-MIMO is possible, and group selection can further minimize non-orthogonality.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates apparatus 10 for band-limited frequency division multiplexing for uplink transmission 12 to a BS 14. The apparatus may be the whole or part of any IoT device which requires an uplink, meaning it has data to send out.

Typically the apparatus 10 has a device functional unit 16 which provides a specific activity of the device such as acquiring data. Modulator 18 then prepares the data for transmission and the data is then transmitted over uplink 12 via transmitter 20.

Apparatus 10 may receive data via downlink 22.

Signal modulator 18 is designed to transmit a signal over a set of contiguous equally spaced frequency sub-carriers ranging from a lowest frequency sub-carrier via intermediate sub-carriers to a highest frequency sub-carrier, as will be explained below. The signal modulator includes a filter 24 which is applied to the signal over the range of the frequency sub-carriers being used. The result is a signal with reduced PAPR, which enables using a power backoff controller 28 to reduce the power backoff in the power amplifier (PA) 26 in the transmission chain of the transmitted signal from the modulator 18 to the transmitter 20.

Use of the filter provides a modified transmission scheme, essentially SC-FDM with PAPR-reduction Filter (PRF). The present embodiments make use of an asymmetric filter in the frequency domain. The transmit (TX) scheme may be implemented in an IoT device for uplink transmission in which reduced PAPR is desirable. The invention is not limited to the specific filter designs discussed in the embodiments but is generic to an asymmetric filter able to provide a specific modified pulse shape in the time domain.

The signal modulator 18 may cyclically extend a sequence of complex-valued numbers modulating an initial set of contiguous sub-carriers to a required larger set of contiguous sub-carriers and apply the asymmetric filtering operation to form a signal whose spectral support covers a set of contiguous sub-carriers that has upper and lower tapering sides and a central region, as will be discussed in greater detail below.

Returning to FIG. 1 and signal modulator 18 can be used in any scheme deploying frequency division multiplexing, including frequency division multiple access (FDMA), single carrier FDMA (SC-FDMA) and orthogonal FDMA (OFDMA).

The signal modulator 18 may provide a demodulation reference signal (DMRS) for each set of the contiguous sub-carriers respectively. Each DMRS may extend over adjacent overlapping regions of neighboring sub-carriers, and may be selected from a finite set of DMRSs which are mutually orthogonal, so that demodulation of UL data transmissions from a plurality of devices can be carried out at the receiver in the frequency regions where such data transmissions may overlap.

Alternatively, the DMRSs for the different sub-carrier sets may alternate over different time intervals between upper and lower overlap regions with the neighboring sub-carriers so that for each overlap region, only one of the DMRSs is being transmitted at any given time interval, but data transmissions which overlap at other time intervals are simultaneously demodulated.

The signal modulator may alternately enlarge and contract the DMRS region by varying the lowest frequency sub-carrier and the highest frequency sub-carrier of the DMRS to cover and uncover the single adjacent overlap region between the DMRS and another DMRS which may be transmitted by another device with a neighboring frequency allocation.

The design of the demodulation reference signal is thus related to the overlapping and filtering carried out on the sub-carriers. The same demodulation reference signal may be used on the downlink, and can be used for standard GFDMA as well as for G2FDMA.

Apparatus 10 may be an Internet of things device (IoT) which communicates with a BS 14 using a contiguous sub-band of frequency division multiple access via band-limited modulation. The contiguous sub-bands are assigned to each IoT device by the BS 14 from a large set of sub-bands, with possible overlaps between different sub-bands in said set, and the IoT device then applies an asymmetric filter, on the signal to be transmitted, over the assigned frequency sub-band.

The IoT device may be a sensor or a wearable, or part of a smart grid or network, or part of a smart home, or any other IoT device.

Figure 3:
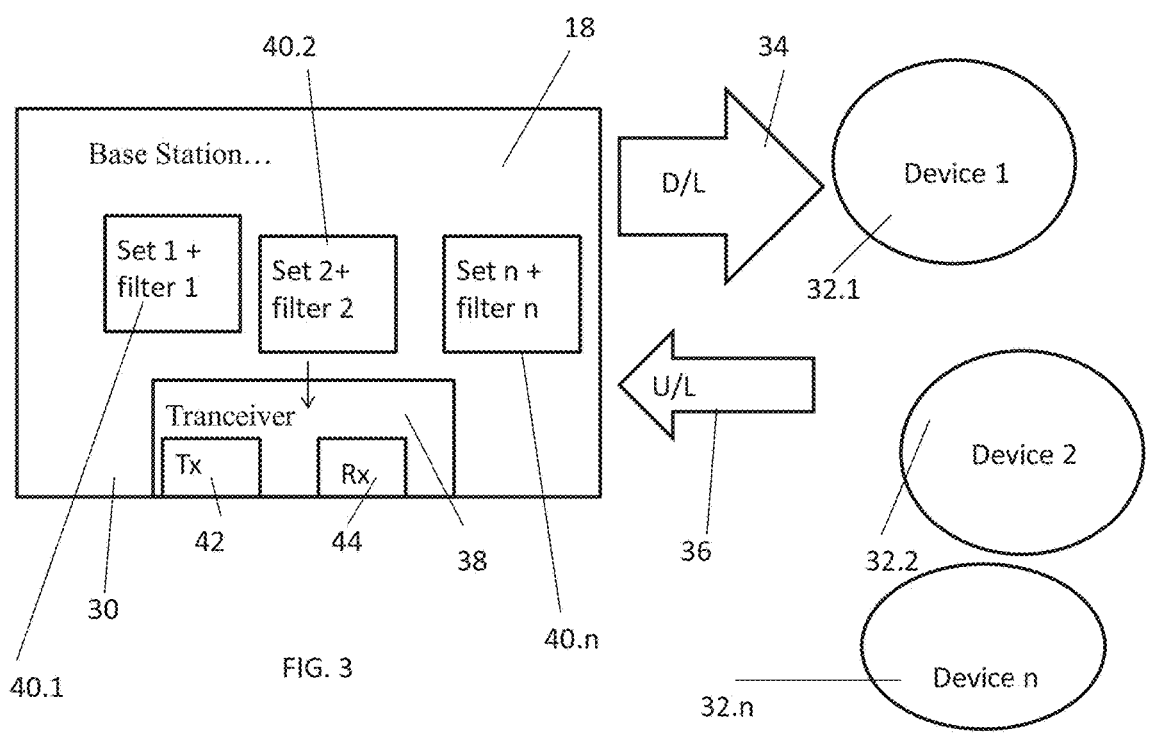
FIG. 3 is a simplified diagram illustrating a base station (BS) for allocating sub-carriers and filters according to an embodiment of the present invention.

Reference is now made to FIG. 3, which illustrates a BS 30, for use with the apparatus of FIG. 1. BS 30 provides communication with IoT devices 32.1 ... 32.n over downlink 34 and uplink 36. Transceiver 38 carries out the communication with the surrounding devices, and the transmitter 42 distributes to each device its own set 40.1 ... 40.n of overlapped contiguous sub-carriers as well as a filter for the set. The filter for each set is chosen from a set of a plurality of filters of which at least one is asymmetric in frequency. The assignment of a single set of sub-carriers together with an indication of the associated filtering is made to the device over the downlink 34. Then the devices themselves apply the indicated filtering operation onto the signal transmitted in the uplink over the assigned set of contiguous sub-carriers, and the BS 30 uses an uplink receiver 44 to receive the filtered signals.

The BS is thus able to provide frequency scheduling of multiple devices, whose transmission sub-bands occasionally overlap in excess bandwidth regions, where each region of overlap contains at least one sub-carrier. The overlap region nevertheless should not extend beyond the band edges. Each individual device is not supposed to be aware of such overlaps, being a slave of the scheduler which is implemented at the BS (or at some other entity in the network controller), and the BS may signal each device its own frequency allocation and specific transmission scheme to use, including which PAPR-reduction filter and which DMRS scheme to deploy.

PAPR in SC-FDM

Figure 4:
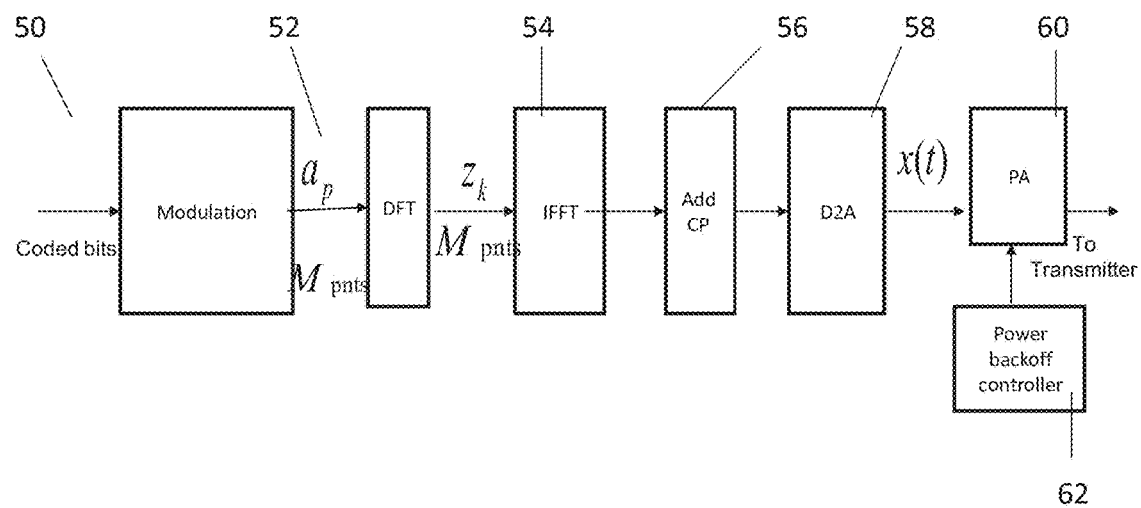
FIG. 4 is a block diagram illustrating a modulation scheme for use with the present embodiments.

The embodiments are now considered in greater detail, and reference is now made to FIG. 4 which is a schematic block diagram of a modulation scheme according to the present embodiments.

In SC-FDM one takes M Quadrature-Amplitude Modulation symbols (QAMs) $a_p$ and performs DFT to create $$z_k = \sum_{p=0}^{M-1} a_p e^{-j\frac{2\pi}{M}kp}, k = 0, \ldots, M-1$$

The M-point sequence $z_k$ is then modulated as in regular OFDM modulation, so that the continuous time signal (up to a certain frequency shift) is:

$$x(t) = \sum_{k=0}^{M-1} z_k e^{j\frac{2\pi}{T}kt}, -T_g \le t \le T$$

Plugging the expression for $z_k$ into the above expression gives:

$$x(t) = \sum_{k=0}^{M-1} \underbrace{\sum_{p=0}^{M-1} a_p e^{-j\frac{2\pi}{M}kp}}_{z_k} e^{j\frac{2\pi}{T}kt}, -T_g \le t \le T$$

and exchanging summation order gives:

$$x(t) = \sum_{p=0}^{M-1} a_p \underbrace{\sum_{k=0}^{M-1} e^{j\frac{2\pi}{T}k(t-\frac{T}{M}p)}}_{\phi(t-\frac{T}{M}p)}, -T_g \le t \le T$$

which is a single carrier signal.

The pulse shape $\phi(t)$ in this case is:

$$\phi(t) = \sum_{k=0}^{M-1} e^{j\frac{2\pi}{T}kt},$$

Figure 5:
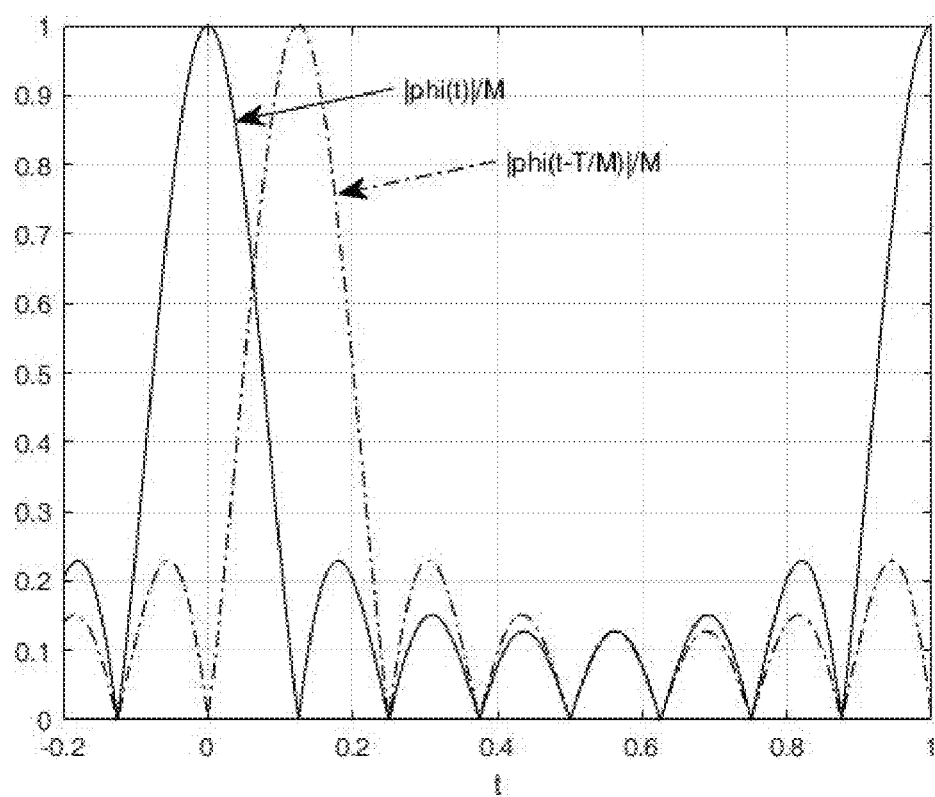
FIG. 5 is a simplified graph illustrating a periodic sinc signal with period T and first null at T/M in the case of M=8, for T=1.

$-T_g \le t \le T$
which is nothing but a periodic sinc signal with period T and first null at T/M as shown in FIG. 5 in the case of M=8, for T=1. FIG. 4 shows modulation block 50 to produce $a_p$, discrete Fourier transform DFT 52 to produce $z_k$, IFFT 54, Add Cyclic Prefix (CP) 56, and digital to analog D2A 58 to finally produce x(t). The output x(t) is a signal with reduced PAPR, which enables using a power backoff controller 62 to reduce the power backoff in the power amplifier (PA) 60 in the transmission chain of the transmitted signal from the modulator to the transmitter.

Figure 6:
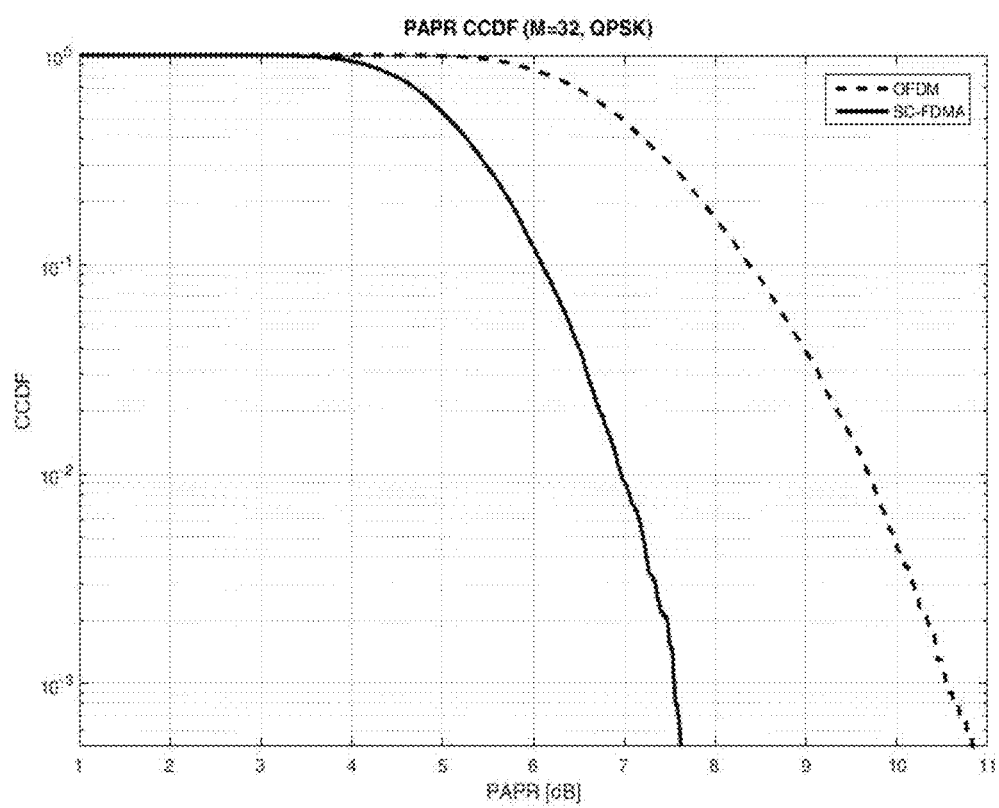
FIG. 6 is a simplified graph showing the PAPR achieved by the sinc signal of FIG. 5.

However the periodic sinc function $\phi(t)$ leads to a quite high PAPR. Although being much better than in OFDM, it is still around 8 dB for QPSK and 32 SCs, as depicted in FIG. 6.

PAPR Reduction Filtering for SC-FDM

PAPR reduction filtering (PRF) may reduce the PAPR at the cost of excess BW. The idea is that with excess BW, e.g., transmitting M QAMs using Q SCs where Q>M, we can improve the pulse shape and therefore the PAPR performance. Thus applying this approach we can replace the sinc pulse with a modified pulse:

$$\tilde{\phi}(t) = \sum_{k=0}^{Q-1} g_k e^{j\frac{2\pi}{T}kt}, -T_g \leq t \leq T$$

which coincides with ordinary SC-FDM for Q=M and $g_k$=1.

Figure 2:
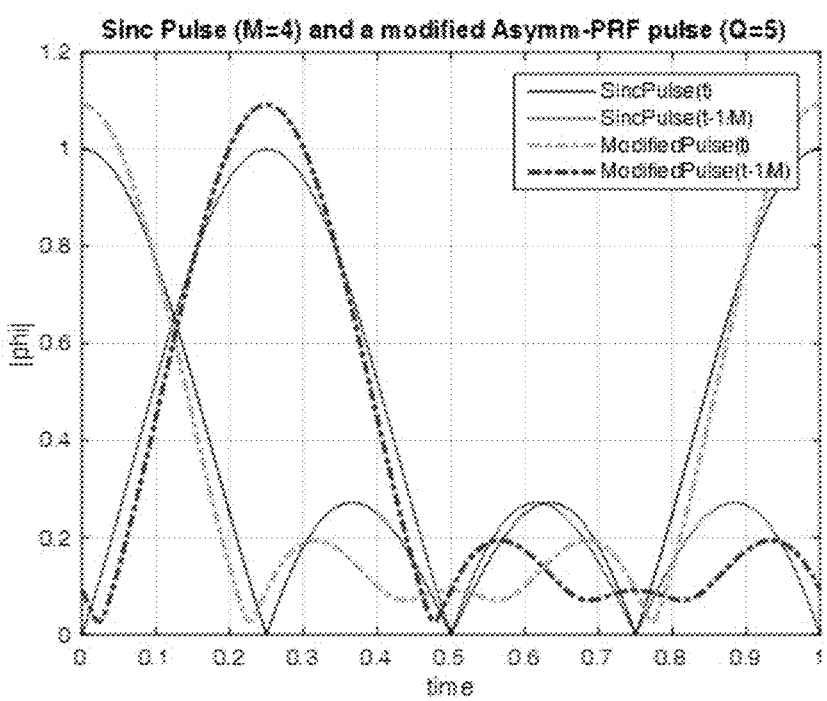
FIG. 2 is a simplified graph illustrating a Sinc pulse and a modified asymmetric PRF pulse for use in the present embodiments.

Reference is now made by way of example to FIG. 2, which is a graph of an exemplary modified pulse corresponding to an asymmetric PRF with M=4 and Q=5. The filter coefficients are [$\sqrt{3}/2$ 1 1 1 1/2], and the unmodified sinc pulse in the figure, corresponding to the symmetric filter coefficients [1 1 1 1] with M=Q=4, is displayed for reference.

Using the modified pulse $\tilde{\phi}(t)$, the transmitted signal takes the form:

$$\tilde{x}(t) = \sum_{k=0}^{Q-1} g_k z_k e^{j\frac{2\pi}{T}kt}, -T_g \leq t \leq T$$

Figure 7:
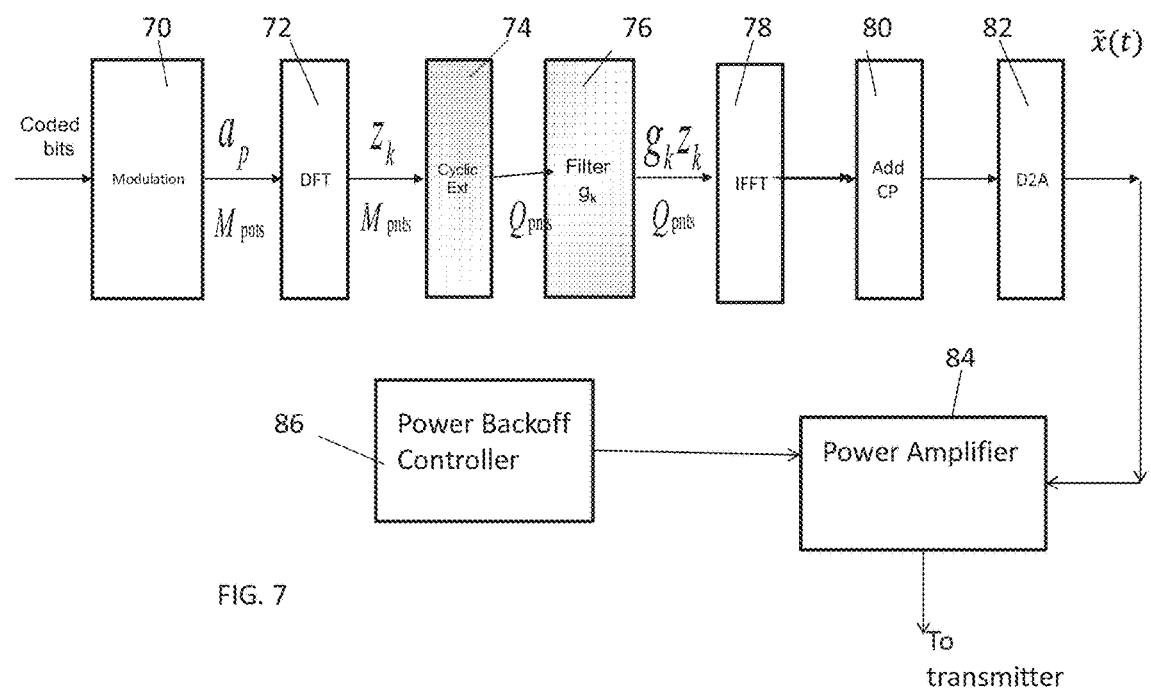
FIG. 7 is a simplified diagram showing a modulation scheme including cyclic extension and frequency-domain filtering according to an embodiment of the present invention.

Bearing in mind that the DFT output $z_k$ is identical to the former case of SC-FDM:

$$z_k = \sum_{p=0}^{M-1} a_p e^{-j\frac{2\pi}{M}kp}, k = 0, \ldots, Q-1$$

and further noting that $z_k$ is periodic in M, we conclude that the DFT output should be cyclically extended in k prior to multiplication by $g_k$ in the process of generating $\tilde{x}(t)$. The result is illustrated in FIG. 7 which shows modulation 70 of coded bits to produce $a_p$. That is followed by a discrete Fourier transform DFT 72 to produce $z_k$. Then a cyclic extension 74 is applied followed by filtering 76. Then IFFT is applied 78, followed by addition of CP 80 and D2A conversion 82 to provide $\tilde{x}(t)$. The output x(t) is a signal with reduced PAPR, which enables using a power backoff controller 86 to reduce the power backoff in the power amplifier (PA) 84 in the transmission chain of the transmitted signal from the modulator to the transmitter.

An ingredient in the OFDM and SC-FDM transmission schemes is the orthogonality between the pulses modulating the different QAMs which are multiplexed together. Mathematically, in the SC-FDM framework and using the notation introduced above, the orthogonality property is expressed as:

$$\int_{t=0}^{T} \phi(t)\phi^*\left(t - \frac{T}{M}n\right)dt = 0, n = 1, 2, \ldots, M-1.$$

It is desirable to maintain the orthogonality property also when using PRF, namely when using a modified pulse $\tilde{\phi}(t)$ instead of the sinc pulse $\phi(t)$. In general, if no restriction on the used QAM order is assumed, this requirement can be shown to lead to the following constraint on the filter coefficients $g_k$:

$$\forall k = 0, 1, \ldots, M-1, \sum_{\substack{l=0 \\ l \equiv k \pmod{M}}}^{Q-1} |g_l|^2 = \text{const (independent of } k)$$

In the above, for each one of the original M tones the absolute values of the filter coefficients are squared and then summed over cyclically extended replicas of the given tone, the result being constrained to remain the same for all M tones.

For instance, for M=4 the 5-tap filter [$\sqrt{1-a}$ 1 1 1 $\sqrt{a}$] satisfies this constraint for any value of a between 0 and 1 (e.g., a=1/4 was used in an example above), and thus respects the orthogonality property.

Note that further reduction in PAPR may be achieved with phase rotation to minimize phase transitions between consecutive QAMs. For example with BPSK (QPSK) we can phase shift every even symbol by 90° (45°); the corresponding modulation schemes are called π/2-BPSK and π/4-QPSK, respectively.

In the particular case of π/2-BPSK modulation, the resulting QAMs $a_p$ are alternating between purely real and purely imaginary complex values. It turns out that the orthogonality requirement between the PRF pulses is somewhat relaxed, reading (for M even):

$$\int_{t=0}^{T} \phi(t)\phi^*\left(t - \frac{T}{M}n\right)dt = \begin{cases} \text{pure imaginary} & \text{if } n = 2, 4, \ldots, M-2 \\ \text{real} & \text{if } n \text{ is odd} \end{cases},$$

and the resulting constraint on the filter coefficients $g_k$ becomes:

$$\sum_{\substack{l=0 \\ l \equiv k \pmod{M}}}^{Q-1} \left(|g_l|^2 + |g_{M/2-l}|^2\right) = \text{const (independent of } k)$$

For instance, the 8-tap filter [$\sqrt{1-a}$ $\sqrt{1-c}$ 1 $\sqrt{1+c}$ $\sqrt{1+a}$ $\sqrt{1+b}$ 1 $\sqrt{1-b}$] satisfies this constraint for any values of a, b, and c between −1 and 1, and thus respects the orthogonality property for M=8 when using π/2-BPSK modulation.

Figure 8:
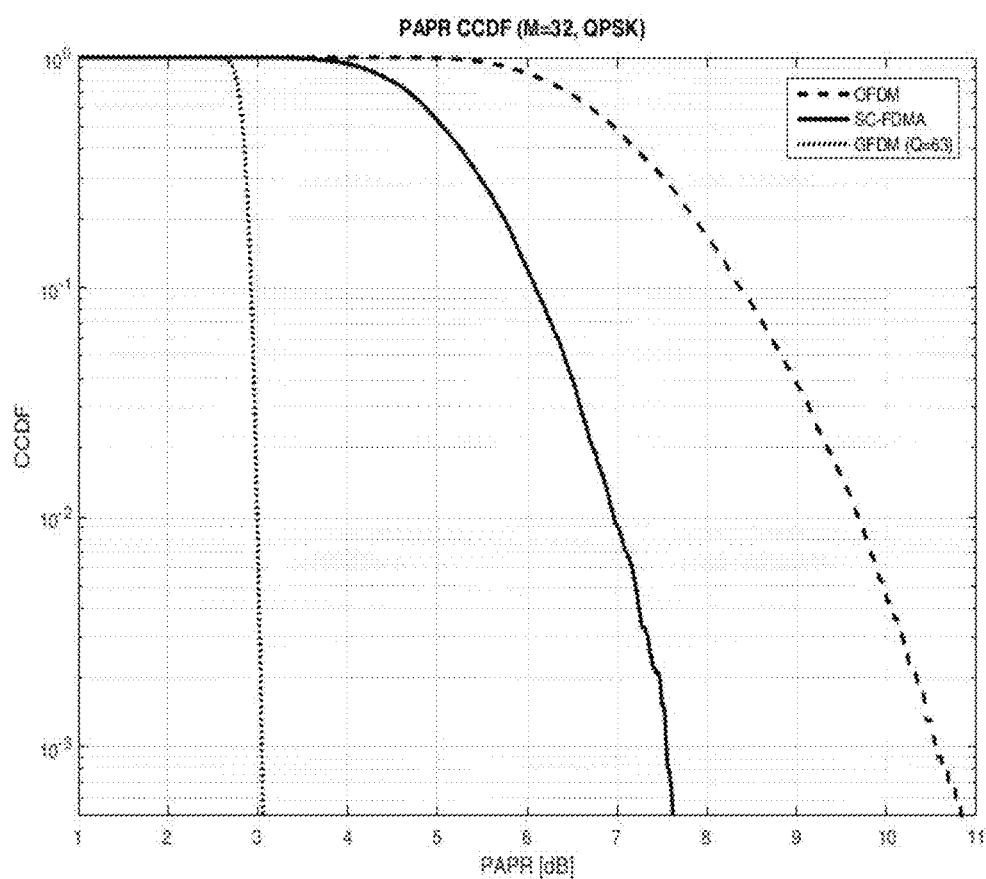
FIG. 8 is a simplified graph showing the PAPR achieved using the embodiment of FIG. 7.

As demonstrated by the graph in FIG. 8, PRF can lead to a significant PAPR reduction, of around 3 dB for QPSK, namely around 5 dB PAPR advantage over SC-FDM. However, this gain comes at the expense of BW excess, for example 33% more BW for M=24 and Q=32 setup.

Generalized FDMA (G-FDMA)

Figure 9:
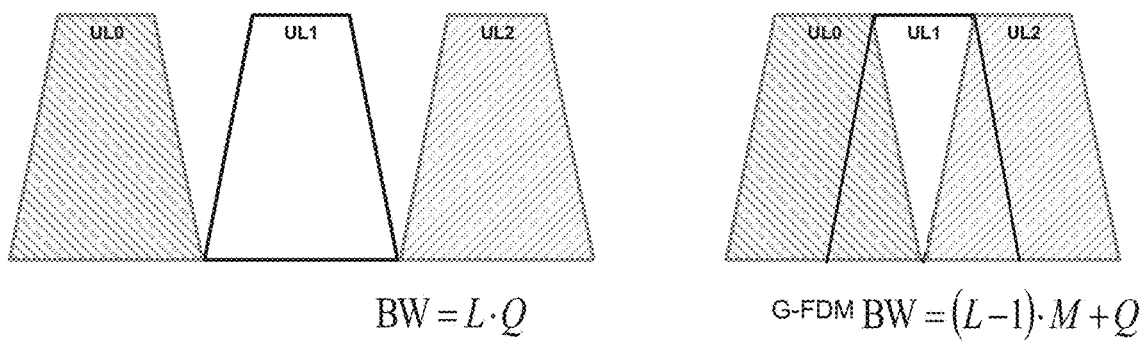
FIG. 9 is a simplified diagram showing how three sub-carriers on the left hand side may be overlapped to reduce overall bandwidth.

Reference is now made to FIG. 9, which is a simplified diagram showing a way of reducing the bandwidth for PRF. Bandwidth reduction for three uplink transmissions UL1, UL2 and UL3 from three different devices, as shown on the left, can be achieved by overlapping the transmissions as shown on the right, such that the PAPR of each UL transmission does not change (remains around 3 dB, in the setup of the example above with QPSK and M=24, Q=32). The total BW is reduced and now there is excess bandwidth only on the uplink band edges, as will be discussed in greater detail below.

Figure 10:
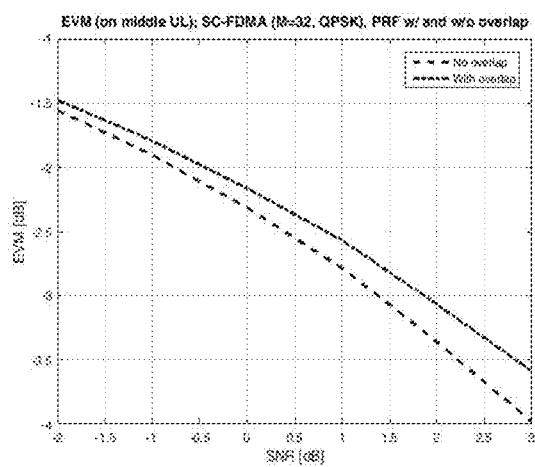
FIGS. 10 and 11 are two simplified graphs showing simulations using the overlapping of FIG. 9.
Figure 11:
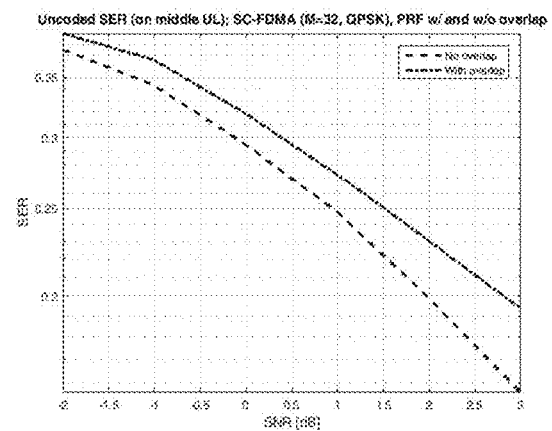

Simulation results are shown in the graphs of FIG. 10 and FIG. 11, and show that even with a simple MMSE (frequency-domain) detector, the degradation due to non-orthogonal overlap between UL transmissions from different sources is smaller than 1 dB.

A Generalized G-FDMA ($G^2$-FDMA)

Figure 13:
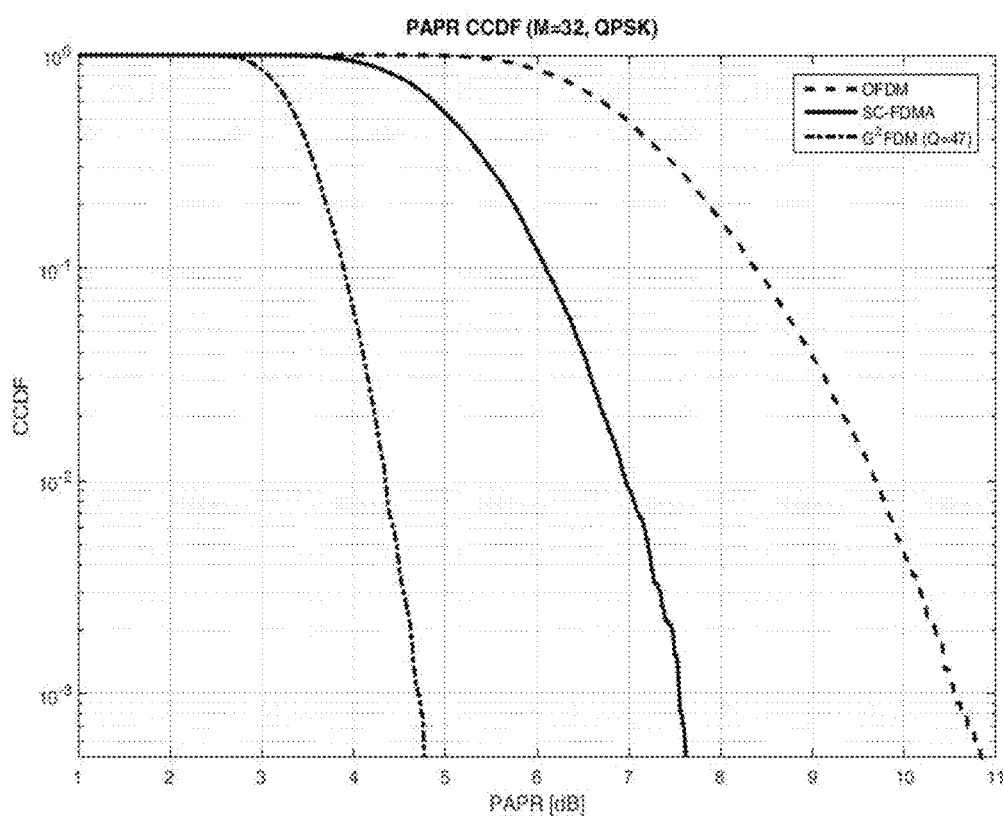
FIG. 13 is a simplified graph showing the PAPR achieved using the embodiment of FIG. 12B against other schemes.

In the present embodiments a scheme called $G^2$-FDMA uses asymmetrical filters for the UL transmissions on the frequency band edges, to totally eliminate the required excess bandwidth of G-FDMA. Referring now to FIG. 12A, the excess bandwidth elimination has been carried out by overlap between the frequency allocations of UL0 and UL1 as well as between UL1 and UL2, but tapered side regions 100 remain. FIG. 12B shows that the excess BW on these side regions have been eliminated by applying asymmetric filtering to UL0 and UL2. Asymmetrical filters, e.g., filters which use excess BW only on one side, still allow significant PAPR reduction compared to SC-FDM, as demonstrated in the graph of FIG. 13.

$G^2$-FDMA may play a useful role in systems with allocations having granularity in the frequency domain. For instance, a challenge in the context of 3GPP NB-IoT is to optimize the UL Multiple-Access scheme within a narrow band of $M_{NB-IoT}$ sub-carriers (e.g., $M_{NB-IoT}=12$, involving a so-called LTE Physical Resource Block (PRB)), where each IoT device is allocated a contiguoues subset of $M_i$ sub-carriers (e.g., 1, 2, 4, or 8 each). In case $M_i>1$, the i-th device may benefit from the PAPR reduction using PRF as described above, increasing its UL coverage and/or spectral efficiency (SE). However, the PRF coefficients of all the devices must be restricted so that the resulting excess BW of each one of them does not extend beyond the $MNB\text{-}_{IoT}$ sub-carriers. Thus, devices which are allocated a subset of sub-carriers at the edge of the NB-IoT BW, may deploy asymmetric filter coefficients $g_k$, for example $|g_k| \neq |g_{Q-1-k}|$, where we further assume that the range Q is defined such that $g_0 \neq 0$, $g_{Q-1} \neq 0$. Given the M, and their location within the $M_{NB-IoT}$ sub-carriers, a guiding principle for choosing optimal values for the filter coefficients $g_k^{(i)}$ (k=0,1, ..., $Q_i$-1), thus implicitly specifying the modified pulse shapes $\phi^{(i)}(t)$, may be stated as follows: Under the excess BW restriction stated above, select the device-specific filter coefficients so that the SE gain from PAPR reduction (obtained through the reduction in the required backoff of the TX power of each device) is as large as possible as compared to the degradation in SE due to the resulting interference caused by the overlap between the allocated TX sub-bands of the devices sharing the NB-IoT BW.

Figure 14:
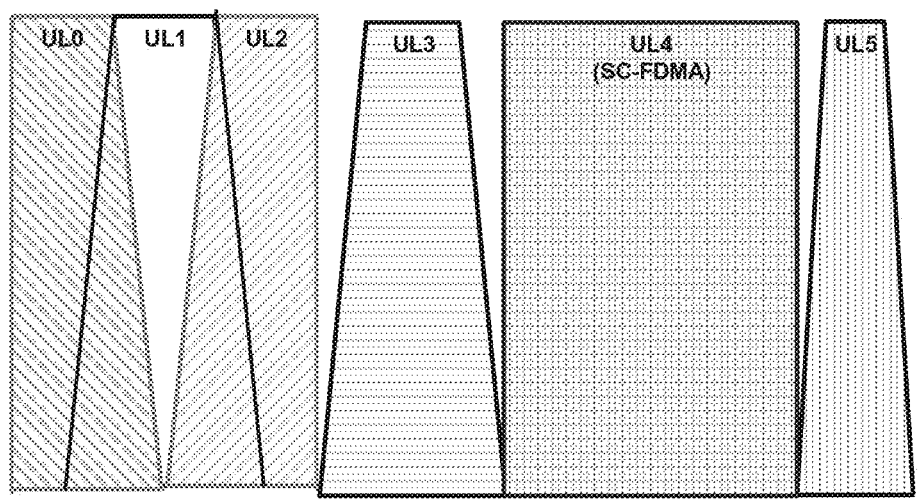
FIG. 14 is a simplified diagram illustrating uplink transmission using an assortment of modulation schemes including asymmetric filtering according to the present embodiments.

Reference is now made to FIG. 14 which is a simplified schematic graph showing how $G^2$-FDMA also paves the way for a flexible frequency allocation structure that includes a mixture of $G^2$-FDMA, G-FDMA and ordinary SC-FDMA with and without PAPR reduction filtering. Allocations can have variable M, variable Q, variable filters (including asymmetric), or imply variable (partial) overlap with other transmissions as shown in the figure where UL0 and UL2 use asymmetric filtering while UL2, UL3, UL4 and UL5 use other schemes.

DMRS design for G-FDMA and $G^2$-FDMA

A challenge in implementing $G^2$-FDMA and G-FDMA is a suitable design of demodulation reference signals (DMRSs), which are used for example for estimation of the wireless channel, and which must be modified once overlaps are allowed between sub-bands which are allocated to different devices for their respective UL data transmissions. Two principal embodiments are provided as follows.

Zig-Zag Design

Figure 15:
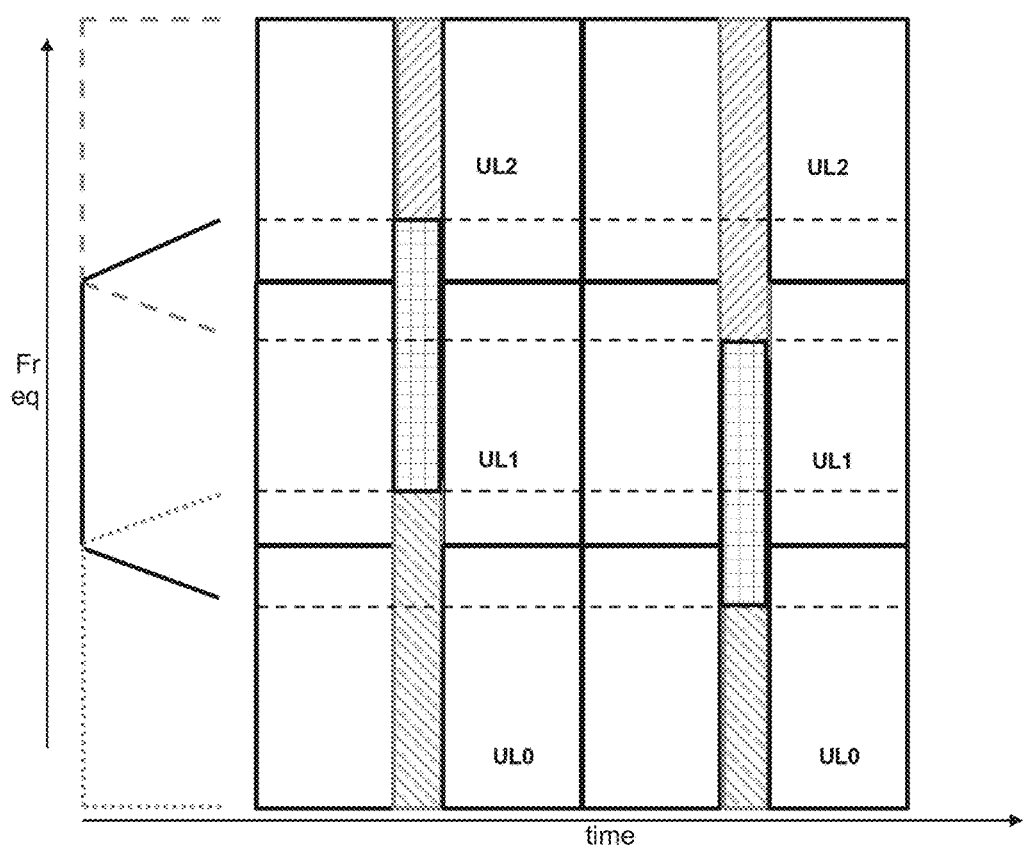
FIG. 15 is a simplified diagram schematically illustrating a first embodiment of a design for demodulation reference signals according to the present invention.

Reference is now made to FIG. 15, which is a simplified diagram illustrating the first of the two embodiments of the DMRS design. The uplink transmit time is divided into time slots, and in a first slot each device's DMRS extends into the lower overlap and then withdraws upwards as needed. On the second slot each device's DMRS extend upwards into the upper overlap and then withdraw downwards as needed. In this manner, devices deploying SC-FDM with excess BW due to PRF may use the same DMRSs used in the LTE standard with only a shift in their frequency allocation, known as Resource Element (RE) mapping. Devices with frequency allocations on the edges may use DMRSs which are mapped on ranges of REs of different lengths at different time slots, either contracted or stretched on each slot, as the data transmissions of these devices may experience an overlap only on one side of their allocated sub-band. Note that low PAPR is inherent for the generation of all DMRSs.

Orthogonal Overlap Design

Figure 16:
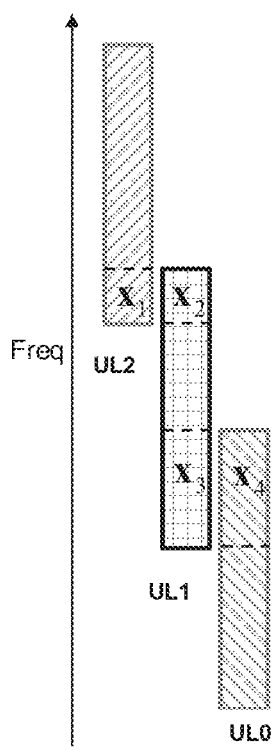
FIG. 16 is a simplified diagram schematically illustrating a second embodiment of a design for demodulation reference signals according to the present invention.

Reference is now made to FIG. 16, which is a simplified diagram illustrating a second embodiment of DMRS design according to the present invention. In the present embodiment, the same DMRS is used in both slots, where DMRS sequences are chosen to be orthogonal on the overlapping sub-carriers, hence:

$$x_1 x_2 = 0, \ x_3 x_4 = 0$$

Naturally, the overlapping segments need not be of the same length, thus the length of x1 and x2 is greater than the length of x3 and x4. As an alternative design, the full orthogonality requirement may be replaced with a looser quasi-orthogonality.

$G^2$-FDMA Signaling

In order to accommodate the $G^2$-FDMA and G-FDMA, the present embodiments may include the following additional signaling for the UL transmissions, which may rely on an existing or new downlink control format. Each device receiving a UL transmission grant within the $G^2$-FDMA and/or G-FDMA system, needs to be signaled the following information, in addition to its frequency resource allocation:

Which filter to use (for data transmission)?

How many tones should be withdrawn from above (for DMRS transmission)?

How many tones should be withdrawn from below (for DMRS transmission)?

So for example, assuming the filters are pre-defined for each M, including the number of excess BW sub-carriers on each side, one needs to begin with 2 bits for setting the type of filter to be used, as shown in Table 1:

TABLE 1

A two-bit pattern for defining the filters

| Bits | Signaling - Which Filter to Use |
| --- | --- |
| 00 | No filter (SC-FDM) |
| 01 | Exceed Up |
| 10 | Exceed Down |
| 11 | Exceed both sides (symmetric) |

Table 2 may be applicable to the case where the device is aware of the location of its M allocated tones within the total NB-IoT bandwidth. In this case just a single bit may be used for setting the filter type:

TABLE 2

Single-bit filter definition

| Bit | Signaling - Which Filter to Use |
|---|---|
| 0 | No filter (SC-FDM) |
| 1 | Exceed both sides, but not beyond NB-IoT BW edge(s) |

In addition, the withdrawal size for DMRS transmission may be signaled. If it is variable, we can use for example the signaling as defined in Table 3:

TABLE 3

Two-bit signaling of DMRS withdrawal length from above and a similar table may be applied for the withdrawal from below.

| Bits | Signaling - How Many SCs to Withdraw from Above |
|---|---|
| 00 | No withdrawal |
| 01 | Withdraw 2 SCs |
| 10 | Withdraw 4 SCs |
| 11 | Withdraw 6 SCs |

It may be possible to include the above signaling bits in the dynamic UL grant message, which is the so-called Downlink Control Indicator (DCI) in LTE, or alternatively include part or all of the indications in higher-layer semi-static signaling message(s), trading off the costly dynamic signaling overhead with some loss of optimality of the UL scheduler.

UL MU-MIMO extension

MU-MIMO is natural to IoT, as in many cases a single BS may serve a large number of IoT devices, and the formation of groups of devices exhibiting UL transmissions which are (quasi) orthogonal between devices in different groups is indeed feasible. Many IoT devices are geographically stationary, so respective groups can be quasi-static. MU-MIMO group selection can be extended to $G^2$-FDMA and G-FDMA group selection, so that overlapping UEs are quasi orthogonal, thus minimizing the non-orthogonality experienced by the receiver in frequency domain. The disclosed $G^2$-FDMA and G-FDMA DMRS design can be extended to MU-MIMO, while making sure the DMRSs are chosen (quasi) orthogonal.

It is expected that during the life of a patent maturing from this application many relevant IoT devices and narrow band frequency division multiplexing transmission schemes will be developed and the scope of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An apparatus, comprising:
a signal modulator, configured to transmit a signal over a set of frequency sub-carriers to a base station or access point, wherein frequency sub-carriers of the set of frequency sub-carriers are contiguous and equally spaced, wherein the set of frequency sub-carriers has a range that extends from a lowest frequency sub-carrier to a highest frequency sub-carrier, and wherein the signal modulator comprises a filter, and the filter is configured to apply asymmetric filtering over the range of the set of frequency sub-carriers;
wherein applying the asymmetric filtering over the range of the set of frequency sub-carriers comprises:
cyclically extending a sequence of complex-valued numbers modulating an initial set of contiguous sub-carriers to a required larger set of contiguous sub-carriers; and
applying the asymmetric filtering onto the larger set of contiguous sub-carriers.

2. The apparatus of claim 1, wherein the filter is configured to apply the asymmetric filtering in a manner that maintains orthogonality between waveforms which are used to modulate data symbols at an input of the signal modulator.

3. The apparatus of claim 2, wherein the filter being configured to apply the asymmetric filtering in the manner that maintains the orthogonality between the waveforms comprises the filter being configured to apply a constraint to coefficients of the asymmetric filtering, wherein for each tone of M tones, absolute values of filter coefficients for the respective tone are squared and then summed over cyclically extended tone replicas, and a resulting sum is constrained to remain the same for all the M tones.

4. The apparatus of claim 2, wherein, for a π/2 BPSK modulation scheme, the filter being configured to apply the asymmetric filtering in the manner that maintains the orthogonality between the waveforms comprises the filter being configured to apply a constraint to coefficients $g_k$ of the asymmetric filtering, wherein for M tones and M being even:

$$\sum_{l \equiv k \pmod{M}} (|g_l|^2 + |g_{M/2-l}|^2) =$$

const (independent of tone index $k = 0, 1, \ldots, M - 1$).

5. The apparatus of claim 1, wherein the signal modulator is configured to perform any one of the following modulations: frequency division multiplexing, frequency division multiple access (FDMA), single carrier FDMA (SC-FDMA) and orthogonal FDMA (OFDMA).

6. The apparatus of claim 1, wherein the signal modulator is configured to transmit a demodulation reference signal for the set of frequency sub-carriers, wherein the demodulation reference signal extends over adjacent overlapping regions of the set of frequency sub-carriers and a neighboring set of frequency sub-carriers, the demodulation reference signal being selected out of a finite set of demodulation reference signals, wherein demodulation reference signals of the finite set of demodulation reference signals are mutually orthogonal.

7. The apparatus of claim 1, wherein the set of frequency sub-carriers comprises intermediate frequency subcarriers in the range between the lowest frequency sub-carrier to the highest frequency sub-carrier, wherein the signal modulator is configured to transmit a demodulation reference signal for the set of frequency sub-carriers, wherein the demodulation reference signal alternates at different time intervals between an upper overlap region and a lower overlap region, wherein the upper overlap region is of the set of frequency sub-carriers and a first neighboring set of frequency sub-carriers on a first side of the intermediate frequency sub-carriers of the set of frequency sub-carriers, and wherein the lower overlap region is of the set of frequency sub-carriers and a second neighboring set of frequency sub-carriers on a second side of the intermediate frequency sub-carriers of the set of frequency sub-carriers.

8. The apparatus of claim 7, wherein the signal modulator is further configured to alternately enlarge and contract the range of the set of frequency sub-carriers on which a respective demodulation reference signal is mapped, to cover and uncover the upper overlap region or the lower overlap region.

9. A base station, comprising:
a transceiver, configured to communicate with a plurality of surrounding devices, wherein a transmitter of the transceiver is configured to:
distribute a plurality of sets of contiguous sub-carriers, wherein each set of the plurality of sets overlaps with another set of the plurality of sets at least in part, wherein each set of the plurality of sets corresponds to a respective filter of a set of a plurality of filters, wherein at least one filter of the plurality of filters is asymmetric in frequency; and
signal, over a respective downlink channel to each of the plurality of surrounding devices, a respective assignment of a single set of the plurality of sets and an indication of an associated filtering method;
wherein the transceiver further comprising an uplink receiver adapted to receive filtered signals.

10. The base station of claim 9, wherein the transceiver is configured to receive signals modulated using frequency division multiplexing, frequency division multiple access (FDMA), single carrier FDMA (SC-FDMA) or orthogonal FDMA (OFDMA).

11. The base station of claim 9, wherein the transceiver is configured to assign a respective demodulation reference signal for each set of the plurality of sets, wherein each demodulation reference signal extends over adjacent overlapping regions of the corresponding set and sets of sub-carriers neighboring the corresponding set, each demodulation reference signal is selected out of a finite set of demodulation reference signals, wherein demodulation reference signals of the finite set of demodulation reference signals are mutually orthogonal, and wherein a receiver of the transceiver is configured to demodulate of data signals received in the overlapping regions.

12. The base station of claim 9, wherein each set of frequency sub-carriers comprises intermediate frequency subcarriers in a range between a lowest frequency sub-carrier of the respective set to a highest frequency sub-carrier of the respective set, wherein the transceiver is configured to assign a respective demodulation reference signal for each set of the plurality of sets, wherein each demodulation reference signal alternates at different time intervals between a respective upper overlap region and a respective lower overlap region of the corresponding set, wherein, for each corresponding set, the respective upper overlap region is of the respective set of frequency sub-carriers and a respective first neighboring set of frequency sub-carriers on a first side of the respective intermediate frequency sub-carriers of the respective set of frequency sub-carriers, and the respective lower overlap region is of the respective set of frequency sub-carriers and a second respective neighboring set of frequency sub-carriers on a second side of the respective intermediate frequency sub-carriers of the respective set of frequency sub-carriers.

13. A method, comprising:
transmitting a signal over a set of frequency sub-carriers, wherein frequency sub-carriers of the set of frequency sub-carriers are contiguous and equally spaced, wherein the set of frequency sub-carriers has a range that extends from a lowest frequency sub-carrier to a highest frequency sub-carrier; and
applying asymmetric filtering over the range of the set of frequency sub-carriers;
wherein applying asymmetric filtering over the range of the set of frequency sub-carriers comprises:
cyclically extending a sequence of complex-valued numbers modulating an initial set of contiguous sub-carriers to a required larger set of contiguous sub-carriers; and
applying the asymmetric filtering onto the larger set of contiguous sub-carriers.

14. The method of claim 13, wherein applying the asymmetric filtering onto the larger set of contiguous sub-carriers comprises applying the asymmetric filtering in a manner that maintains orthogonality between waveforms which are used to modulate data symbols.

15. The method of claim 14, wherein maintaining the orthogonality comprises:
applying a constraint to coefficients of the asymmetric filtering, wherein for each tone of M tones, absolute values of filter coefficients for the respective tone are squared and then summed over cyclically extended tone replicas, and a resulting sum being constrained to remain the same for all the M tones.

16. The method of claim 14, wherein, for a $\pi/2$ BPSK modulation scheme, maintaining the orthogonality comprises applying a constraint to coefficients $g_k$ of the asymmetric filtering, wherein for M tones and M being even:

$$\sum_{l \equiv k \pmod{M}} (|g_l|^2 + |g_{M/2-l}|^2) =$$

const (independent of tone index $k = 0, 1, \ldots, M-1$).

17. The method of claim 13, further comprising:
transmitting a demodulation reference signal for the set of frequency sub-carriers, wherein the demodulation reference signal extends over adjacent overlapping regions of the set of frequency sub-carriers and a neighboring set of frequency sub-carriers, the demodulation reference signal being selected out of a finite set of demodulation reference signals, wherein demodulation reference signals of the finite set of demodulation reference signals are mutually orthogonal; and are used to demodulate data received in the overlapping regions.

18. The method of claim 13, further comprising:
transmitting a demodulation reference signal for the set of frequency sub-carriers, wherein the demodulation reference signal alternates at different time intervals between an upper overlap region and a lower overlap region of the set of frequency sub-carriers and neighboring sets of frequency sub-carriers.

* * * * *